July 4, 1939.  E. C. HORTON  2,165,181
MOTOR VEHICLE ACCESSORY SYSTEM
Filed Dec. 22, 1936
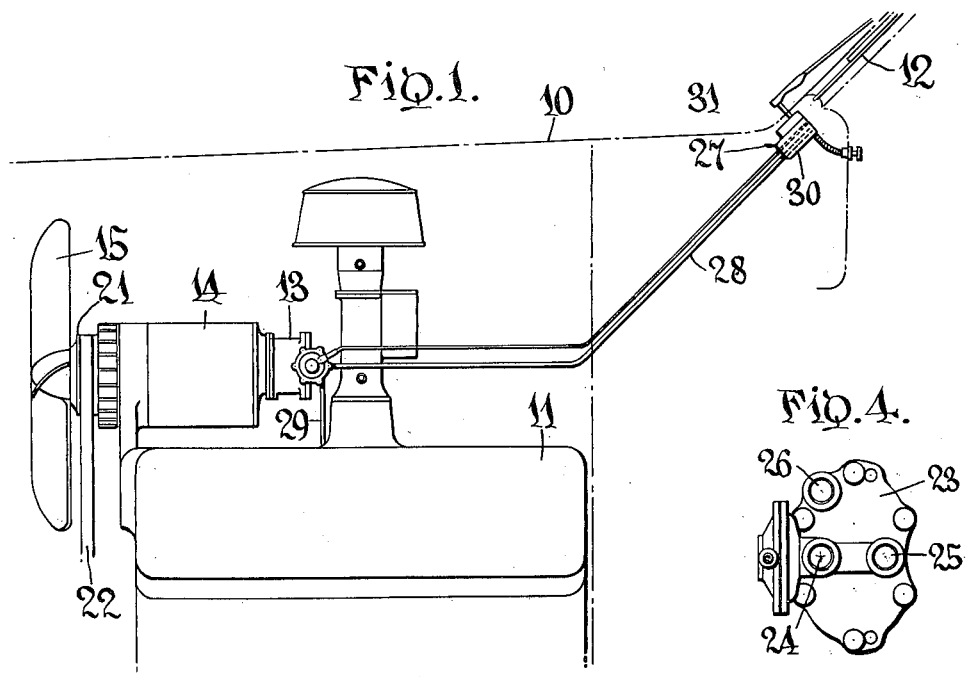
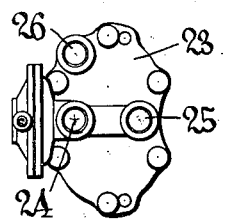
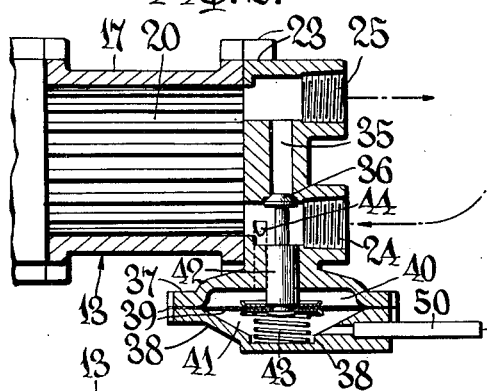
INVENTOR
Erwin C. Horton,
BY
Beau, Brooks, Buckley & Beau.
ATTORNEYS Patented July 4, 1939

2,165,181

UNITED STATES PATENT OFFICE 2,165,181

MOTOR VEHICLE ACCESSORY SYSTEM

Erwin C. Horton, Hamburg, N. Y., assignor to Trico Products Corporation, Buffalo, N. Y.

Application December 22, 1936, Serial No. 117,179

13 Claims. (Cl. 60—60)

It has heretofore been proposed, when it is desired to drive a mechanical device from a remotely located motive means, to associate a pump for generating differential pressure with the motive means, provide a driving motor for the mechanical device which motor is responsive to differential pressure, and provide suitable conduit means for transferring the differential pressure of the pump to the remotely located driving motor.

This general organization has found convenient application in automotive vehicles where it is desired to use the vehicle driving engine for driving accessories or other devices located remotely from the vehicle engine.

A specific example of such an organization is found in the disclosure of the present invention wherein, for the purposes of elucidating the principles of the invention, I have shown a vehicle having an engine of the internal combustion type and a windshield having an automatic wiper associated therewith.

The automatic wiper is preferably provided with a motor capable of actuation by differential fluid pressure and an example of such a motor is found in Patent No. 1,840,233 to Henry Hueber. The fluid pressure for operating the motor may be derived from a pump having connection with a convenient driving means which in the present instance is the cooling fan and generator shaft of an internal combustion engine. The differential pressure generated by the pump is communicated to the remotely located motor by suitable conduit means.

In such a system it frequently happens that the accessory is desired to remain idle at a time when the motive engine of the vehicle is in motion. Unless a clutch is provided between the motive engine and the pump, which is expensive and complicates construction and operation, the pump continues to develop and transmit to the fluid motor a pressure differential unabated and with various harmful and objectionable effects.

In the case of gear pumps and pumps of that general class it has been found that the pressure differential builds up to such an extent, on opposite sides of the impelling members of the pump, that objectionable noises develop, generally in the form of a whistle or a popping sound. In suction gear pumps, for example, when the pressure differential is high, the spaces between the gear teeth, in moving from the low to the high pressure side of the pump, are highly evacuated. As each of these spaces becomes exposed to the zone of atmospheric pressure adjacent the outlet side of the pump, it is rapidly filled with air, causing a popping sound. The rapid succession of pops so emitted merge, at higher speeds, into a whistling sound.

Another difficulty is encountered when the suction acting on the motor is excessive, the sealing lubricant with which the motor is provided is withdrawn therefrom into the suction line, leaving an improperly sealed motor with a correspondingly lowered efficiency.

To remedy the foregoing objectionable conditions, and relieve the pumping elements and their driving means of the useless work which they ordinarily do during periods of inactivity of the accessory, I have provided a system wherein, under certain operating conditions, the pressure differential is automatically lowered to a predetermined constant value. In one form I accomplish ths object by establishing a variable and automatically controlled communication between the opposite sides of the pumping means which results in controlled by-passing of fluid from the high to the low side of the pump and a correspondingly lowered pressure differential. Where the pressure ranges involved permit and are appropriate, the controlled communication referred to may be between one side of the pump and the atmosphere.

In certain cases, and particularly in the case of windshield wiper motors operating from a pressure differential, it is desirable to have some pressure differential, even though a decreased one, present when the accessory itself is inactive. In Patent No. 1,840,233 hereinbefore referred to and relating to a windshield cleaner motor, differential pressure is utilized, upon actuation of a manual valve to stop the operation of the accessory, in moving the parts to a predetermined stopped position and for subsequently holding the parts in such predetermined position during all periods when the accessory is desired to be inactive and a source of differential pressure is available.

It will be seen from the foregoing that, in a sense, the motor is really never inoperative while fluid pressure is being applied thereto. For a number of reasons,—the force of gravity, jarring, inertia,—the parts of the accessory tend often to leave their proper idle position, and each time this occurs the motor holds the parts in proper idle position, or, if the force tending to move them cannot be overcome by the motor, it promptly moves them to proper position when the force is removed. In a word, the motor is always doing useful work while differential pressure is available and its apparently stopped condition is merely a phase of its operation, the motor being completely idle only when its source of differential pressure is cut off.

Having the stated considerations in mind I have devised a system which fulfills the needs and overcomes the objections set out above, and one which has other advantages which will appear from a study of the following specification and the accompanying drawing, wherein:

Fig. 1 is a side elevational view showing a vehicle having a windshield and an internal combustion engine and equipped with one form of the present invention.

Fig. 2 is a horizontal cross-sectional view through the pumping means and a top plan view of the accessory with which it is in the present example associated.

Fig. 3 is a side elevational view of the pumping means with a portion of the casing removed.

Fig. 4 is a rear end elevational view of the pumping means.

In the drawing 10 indicates a motor vehicle, shown fragmentarily and having an internal combustion engine 11 and a windshield 12. The pumping means of the present invention may be associated with any source of kinetic energy, actual or potential, but in the present instance I have shown a rotary gear pump 13 positioned adjacent a generator 14 which is associated with the usual cooling fan 15 of the internal combustion engine.

The pumping means 13 in the form illustrated comprises a casing 17 having upper and lower abutting and horizontally extending cylindrical portions for journalling and housing a pair of gears which form pumping elements. In the present instance the lower gear 20 is directly connected for rotation with the shaft of the generator 14 and fan 15, all of which parts are caused to rotate by means of the pulley 21 and the belt 22 connecting the pulley to the crank shaft of the engine 11.

The casing 17 is closed at its forward end by abutment against the casing of the generator 14 and at its rear end by a cover member 23.

The cover member is provided with inlet and exhaust ports 24 and 25 respectively which communicate with the interior of the casing 17 at points lying on opposite sides of the point of engagement of the upper gear (not shown) and the lower gear 20.

A second inlet port 26 is provided in the cover member 23 and is connected to the force-feed lubrication system of the engine and a sufficient quantity of oil is introduced at this port to provide an effective liquid seal for the pump, and thereby materially enhance its efficiency.

Air is drawn into the pump chamber from an accessory indicated generally at 27 through a conduit 28 indicated by the dot and dash line in Fig. 2 and the air so induced, together with the oil entering the chamber at 26, is discharged through the port 25 and a conduit 29 leading into the crank case of the vehicle engine 11, where the oil settles to the bottom and the air escapes through the usual breather or vent.

The accessory 27 which in the present instance is being operated by the gear pump 13 is provided with a vane type motor 30 wherein automatic valve means are provided for alternately applying differential pressure to the opposite sides of a vane connected to a rock shaft 31.

Motors of this class are commonly used for driving automatic windshield wipers and Patent No. 1,840,233 referred to above shows a vane type fluid motor provided with special manual valve means for rendering the motor operative and inoperative. This valve means is so arranged that, when in operative position, fluid pressure is admitted through the valve and conducted to a snap-action valve mechanism by means of which the differential pressure is applied to opposite sides of the vane or piston and periodically reversed to cause oscillation thereof.

In the above mentioned patent when the manual valve means is moved to cause the motor to cease moving, the valve means provides for direction of the fluid pressure continuously against one side of the vane or piston, the vane or piston thereby stopping at a predetermined extremity of its movement and being held in such position by the differential pressure. It will be observed that, with the intake port 24 of the pump 13 connected to the motor 30, the pump will tend to evacuate the motor chamber 30 and the differential pressure will be this sub-atmospheric pressure working against the pressure of the atmosphere, resulting in what is generally known as a suction-operated motor. It is obvious, however, that pressure higher than atmospheric could be used in place of sub-atmospheric without departing from the principles of the invention and merely by reversing the direction of rotation of the pumping elements.

Referring again to the pumping means, the inlet and exhaust ports 24 and 25 are connected by a passage 35 which is normally closed by a valve 36. The cover member 23 has a lateral extension 37 which, with a cup member 38 and a diaphragm 39 supported therebetween, forms a pair of chambers 40 and 41.

The valve 36 has a stem 42 which is slidably positioned in an opening in the portion 37 of the cover member 23 and is connected at its other end to the diaphragm 39. A coil spring 43 is positioned between the cup member 38 and the diaphragm 39 and serves to yieldingly urge the valve 36 against its seat at one end of the passage 35.

In the present instance the port 24 leading to the low pressure side of the pump chamber is in open communication with the chamber 40 as by means of a passage 44, and therefore the pressure obtaining in the chamber 40 is always substantially the same in degree as the pressure on the intake side of the pump.

The manual control valve 45 of the motor 30 is shown in Fig. 2 in shut-off position. To cause operation of the motor and its associated accessory the valve 45 is moved to the right as seen in Fig. 2, whereupon the low pressure of conduit 28 is introduced into a passage 46 formed in the motor casing and, by means of the ports 47 and 48 and another passage 49 formed in the motor casing, to a snap-action distributing valve mechanism (not shown).

A conduit 50 establishes open communication between the chamber 41 of the pumping means and a passage 51 of the motor 30. When the valve is in its right hand position, Fig. 2, and the motor is running, the passage 51 communicates with the atmosphere, since the bottom of the slide valve 45 to the left of the openings 47 and 48 is relieved or cut back from the bearing face 52 of the motor casing.

With the motor in normal operation, then, and with the valve 45 in its right hand position, the following conditions prevail. The pressure at the intake side of the pump and in the port 24 and the chamber 40 is less than atmospheric.

The pressure at the exhaust side of the pump in the port 25, and in the chamber 41 is substantially equal to the pressure of the atmosphere.

It will be observed that the pressure of the atmosphere in the passage 35 tends to unseat the valve 36 while the atmospheric pressure in the chamber 41, acting upon the diaphragm 39 tends to hold the valve against its seat. These two forces approximately negative each other and it has been found that a comparatively light pressure, exerted by the coil spring 43, holds the valve 36 securely against its seat and insures full efficiency of the pump during operation of the motor.

When the valve 45 is moved to the position shown in the drawing to shut the motor off, the ports 47 and 48 serve to connect the passage 46 with one side of the chamber of the motor 30 to move the piston to that side of the motor and hold it there by continuous application of reduced pressure. At the same time an extension 53 of the valve port 47 establishes communication between the reduced pressure passage 46 and the passage 51, the conduit 50 and the chamber 41. The chamber 41 is in this manner partly evacuated and, when the pressure differential between the chamber 41 and the passages 25 and 35 is sufficient to overcome the bias of the spring 43, the valve 36 is opened by the atmospheric pressure in the passages 25 and 35.

With the valve 36 open or partly open, some of the fluid in the passages 35 and 25, which is under greater pressure than the fluid in the passage 24 will escape into the latter passage, tending to reduce the pressure differential. The degree of opening of the valve 36 will vary with and be controlled directly by the pressure differential; and the bias of the spring is such as to insure that the pressure on opposite sides of the pump will not be completely equalized, that is, that all of the fluid moved by the pump is not immediately by-passed by the passage 35.

In the present adaptation of my invention the degree of bias of the spring and the proportioning of passages is such that a substantially constant pressure differential is maintained which is sufficient to move the motor and its associated devices to the predetermined stopped position referred to above and to hold the parts in such position.

This differential is ordinarily much lower than the differential normally available for ordinary operation of the motor and the lowered pressure differential has been found to eliminate the objectionable noises previously referred to and to give various other advantages and benefits.

While I have carried through, in my specification, one specific embodiment and application of my invention, it is apparent that the accessory need not be a windshield cleaner, that the motor need not be of the type shown, that the driver for the pumping means may be of any desired form, that pressure greater than atmosphere may be used instead of sub-atmospheric pressure or suction, and that many other changes and modifications may be made without departing from the spirit or scope of the invention as defined in the appended claims.

I claim:

1. In a fluid pressure transmission system, a fluid pressure generator of varying output having inlet and exhaust ports, a communicating passage extending therebetween, a valve for controlling the communication between said ports, means sensitive to the pressure differential between the inlet and exhaust ports of said pump for controlling the degree of opening of said valve to render said pressure differential substantially constant, a fluid pressure sensitive device associated with said fluid pressure generator, and means for rendering said device selectively active and inactive and for simultaneously rendering said fluid pressure sensitive control means inactive and active respectively.

2. In a fluid pressure transmission system, a fluid pressure generator of varying output, a fluid pressure operated motor, means for transmitting fluid pressure from said generator to said motor to exert differential pressure thereagainst during all periods of operation of said generator, manually operable valve means on said motor for rendering said motor operative and inoperative, pressure regulator means associated with said fluid pressure generator for rendering toe output of said generator substantially constant, said pressure regulator means being rendered operative by movement of said valve means for rendering said motor inoperative.

3. In combination fluid circulating means subject to variation in output, a motor operable from said fluid circulating means and having a plurality of operating passages for selective connection with said circulating means, control means for effecting said selective connection, and means for by-passing a portion of the fluid circulated by said fluid circulating means, said control means rendering said by-passing means operative when said motor is connected with said fluid circulating means through one of said passages and inoperative when said motor is connected with said fluid circulating means through another of said passages.

4. In combination, fluid circulating means, a motor operable from said fluid circulating means, control means for rendering said motor operative and inoperative, means for by-passing fluid circulated by said fluid circulating means, and means for varying the capacity of said by-passing means in proportion to the pressure differential of the fluid in said circulating means, said control means rendering said by-passing means operative when said motor is inoperative and inoperative when said motor is operative.

5. In a fluid pressure transmission system, a fluid pressure generator having a varying output, a fluid pressure responsive motor operable therefrom, fluid-responsive control means for rendering the pressure differential of said generator substantially constant, conduit means establishing fluid communication between said generator and said motor, other conduit means for establishing fluid communication between said motor and said control means, valve means which in one position connects said first conduit means with said motor for operating same and in another position connects said first conduit with said second conduit for rendering said fluid-responsive pressure differential control means operative.

6. In a fluid pressure transmission system, a fluid pressure generator, a fluid pressure responsive motor operable therefrom and having a plurality of operating conditions requiring different degrees of fluid pressure for accomplishment, fluid-responsive control means for controlling the pressure differential of said generator, fluid communication means between said generator and said motor and between said motor and said control means, and a manually selective distributing valve for controlling the method of application of fluid pressure to the motor and for simultaneously controlling the application of fluid pressure to said pressure responsive control means whereby the degree of fluid pressure developed by the generator is controlled by the condition of operation of the motor.

7. In a motor vehicle power plant having a pressure operated accessory motor and means in said power plant for generating differential fluid pressure, conduit means establishing communication between said generating means and said motor, control means for rendering said motor operative and inoperative, means for by-passing fluid generated by said generating means and means for varying the capacity of said by-passing means in proportion to the pressure differential created by said generating means, said control means rendering said by-passing means operative when said motor is inoperative and inoperative when said motor is operative.

8. A windshield cleaner motor connected with a source of differential pressure and having a casing and a member reciprocable therein under the influence of differential pressure applied alternately to opposite sides of said member, means for directing said differential pressure constantly against one side of said member to stop and hold said member in a predetermined stopped position, and means operable automatically with said last mentioned means for venting said differential pressure to the atmosphere for lowering the pressure differential when the motor is in a stopped condition.

9. A windshield cleaner motor connected with a source of differential pressure and having a part movable alternately in opposite directions under the influence of said differential pressure, means for selectively directing said differential pressure constantly against one side of said member to urge said member to a predetermined stopped position, and means operative automatically with said last mentioned means for venting said differential pressure to the atmosphere for lowering the pressure differential when the motor is in a stopped condition.

10. A windshield cleaner motor connected with a source of differential pressure and having a casing and a member reciprocable therein under the influence of differential pressure applied alternately to opposite sides of said member, means for directing said differential pressure constantly against one side of said member to stop and hold said member in a predetermined stopped position, and means operable automatically with said last mentioned means for by-passing said differential pressure for lowering the pressure differential when the motor is in a stopped condition.

11. A windshield cleaner motor connected with a source of differential pressure and having a casing and a member reciprocable therein under the influence of differential pressure applied alternately to opposite sides of said member, means for directing said differential pressure constantly against one side of said member to stop and hold said member in a predetermined stopped position, and means operable automatically with said last mentioned means for partially by-passing said differential pressure for lowering the pressure differential when the motor is in a stopped condition.

12. A windshield cleaner system for motor vehicles comprising an air pump operable from the vehicle power plant, an air operated windshield wiper connected to a pump by a conduit, means for arresting the wiper and holding it in a parked position by the continuous application of fluid pressure differential provided by the pump, and means for dissipating the pressure influence of the pump on the wiper to regulate the degree of holding pressure differential.

13. A windshield cleaner system for motor vehicles comprising a suction pump, a suction operated windshield wiper connected to the pump by a suction line, means for fluid locking the wiper in a parked position, and means for venting the suction line to the atmosphere to regulate the degree of fluid lock.

ERWIN C. HORTON.